United States Patent
Emmett

(10) Patent No.: US 6,752,569 B2
(45) Date of Patent: Jun. 22, 2004

(54) UNDERWATER TOOL

(75) Inventor: Robert Emmett, Lancaster (GB)

(73) Assignee: BSW Limited, Lancaster (GB)

( * ) Notice: Subject to any disclaimer, the term of this patent is extended or adjusted under 35 U.S.C. 154(b) by 0 days.

(21) Appl. No.: 10/345,673

(22) Filed: Jan. 16, 2003

(65) Prior Publication Data

US 2003/0161689 A1 Aug. 28, 2003

Related U.S. Application Data

(63) Continuation of application No. PCT/GB01/03192, filed on Jul. 12, 2001.

(30) Foreign Application Priority Data

Jul. 17, 2000  (GB) ............................................... 0017484

(51) Int. Cl.[7] ............................. F16L 1/12; F16L 55/10; B66C 1/00
(52) U.S. Cl. ........................ 405/173; 405/158; 166/387; 138/93; 294/66.1
(58) Field of Search ................................ 405/158, 173; 166/338, 387, 187; 138/93, 89, 97; 15/104.061

(56) References Cited

U.S. PATENT DOCUMENTS

| | | | |
|---|---|---|---|
| 3,645,563 A | * 2/1972 | Rochelle | ...................... 285/24 |
| 3,751,932 A | 8/1973 | Matthews, Jr. | |
| 3,777,499 A | * 12/1973 | Matthews, Jr. | ............... 405/173 |
| 3,817,200 A | 6/1974 | Hess et al. | |
| 3,842,612 A | 10/1974 | Arnold | |
| 3,931,670 A | * 1/1976 | Arnold | ........................ 405/170 |
| 3,943,982 A | * 3/1976 | Lecordier | ...................... 138/89 |
| 3,978,892 A | * 9/1976 | Scodino | ........................ 138/89 |
| 4,011,620 A | * 3/1977 | Southgate | ............... 15/104.062 |
| 4,498,811 A | * 2/1985 | Fern et al. | ...................... 138/89 |
| 4,772,158 A | 9/1988 | Coone | |
| 4,887,931 A | * 12/1989 | Frisby et al. | ................... 138/93 |
| 5,044,827 A | * 9/1991 | Gray et al. | .................. 405/173 |
| 5,188,483 A | * 2/1993 | Kopp et al. | .................. 405/191 |

FOREIGN PATENT DOCUMENTS

GB  2214259  * 8/1989  .................. 405/173

* cited by examiner

Primary Examiner—Jong-Suk (James) Lee
(74) Attorney, Agent, or Firm—Gauthier & Connors, LLP

(57) ABSTRACT

To obviate the need for hydraulic lines, from the surface, external water pressure is used to compress a seal member and form a seal with a surrounding pip. Valve is opened at depth to allow water to act on a piston, moving it within a chamber so as to compress the seal member. A second valve may be opened so that water acts on the opposite end of the piston to release the seal member.

2 Claims, 2 Drawing Sheets

UNDERWATER TOOL

This is a continuation of application No. PCT/GB01/03192, filed Jul. 12, 2001.

BACKGROUND AND BRIEF SUMMARY OF THE INVENTION

This invention concerns a tool for use in deep water, which tool consists of or includes a sealing device.

Such a tool, with a sealing device, may be used for recovery of pipelines from such great depths that all work has to be carried out by remotely operated vehicles, as opposed to divers. A number of known tools of this type use hydraulic pressure to operate the sealing device, whereby the tool fastens itself to a pipe section, for hauling same back to the surface. Obviously, these tools rely on having a hydraulic line from the surface to the tool, which may be on the sea bed.

An object of the present invention is to obviate the need for such a hydraulic line.

According to the present invention, in a sealing device of an underwater tool, external water pressure at depth can act on a piston, which is movable within a chamber, to cause it to compress a seal member.

The invention will be described further, by way of example, with reference to the accompanying drawings, in which:

DETAILED DESCRIPTION OF THE INVENTION

Figure 1:
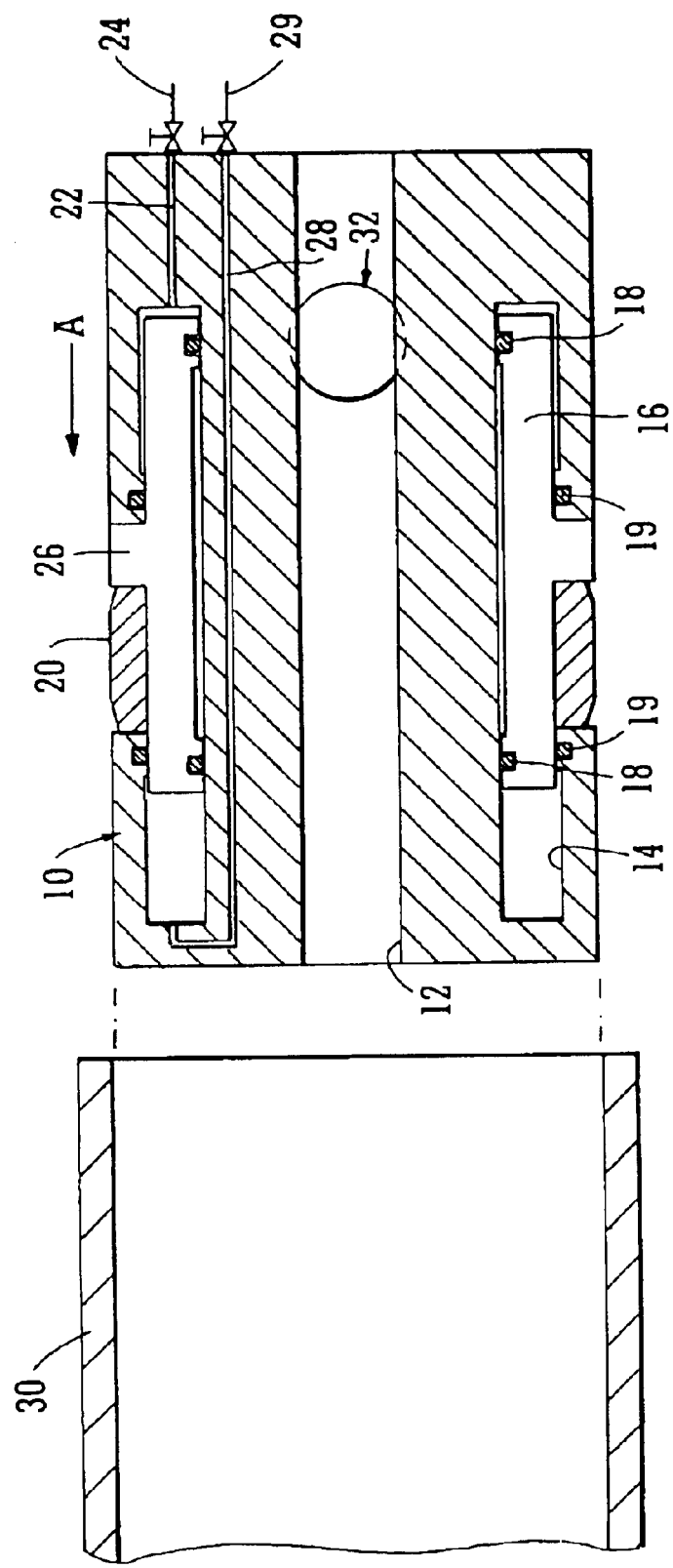
FIG. 1 is a schematic sectional view of a pipe and of a sealing device according to the invention, which will locate in the pipe.

Referring to FIG. 1, the exemplary sealing device comprises a cylindrical housing (10) having a central through bore (12). An annular chamber (14) is formed in the housing (10) and an annular piston (16) is axially slidable within this chamber (14). The piston (16) is longitudinally shorter than the chamber (14) so that a space remains within the chamber at one or both ends of the piston (16), depending on its position therein. Two O-ring seals (18) are provided between the piston (16) and the radially inner wall of the chamber (14), and similarly two O-ring seals (19) are provided between the piston (16) and the radially outer wall of the chamber (14). A lateral extension (26) of the piston (16) projects into an opening in the housing (10) adjacent an annular sealing member (20) which may be of any conventional deformable packing material, such as rubber or synthetic rubber or substitutes therefor. Movement of the piston (16) in the direction indicated by arrow "A" causes its lateral extension (26) to compress and deform the sealing member (20) causing it to bulge outwardly. Thus, when the housing (10) is a close fit inside a pipe section (30), a tight seal can be created between the housing (10) and the pipe interior by movement of the piston (16) in the direction of arrow "A".

A first inlet in the form of a conduit (22) leads into one end of the chamber (14) from the exterior and is fitted with a first shut off valve (24). A second inlet in the form of a conduit (28) leads into the opposing end of the chamber (14) from the exterior and is fitted with a second shut off valve (29).

At the surface, before submersion of the sealing device, the chamber (14) is filled with air at normal atmospheric pressure and the valves (24) and (29) are closed. The sealing device is then lowered to the sea bed and, by means of a remotely operated vehicle (not shown), is manoeuvred into position inside the pipe section (30) awaiting recovery. The vehicle then opens the first valve (24) for about a minute to allow water through the conduit (22) into the first end of the chamber (14), thus moving the piston (16) in direction "A" and compressing the seal (20) to engage the pipe (30). The valve (24) is then closed to maintain the pressure on the seal (20) as the pipe (30) is recovered to the surface.

If it is necessary to disengage the sealing device housing (10), from the pipe (30) while the latter is still on or near the sea bed, the vehicle can open both the valves (24) and (29) to allow water to enter aria both the conduits (22) and (28) and equalise pressure at the respective ends of piston (16) The seal (20) will then recover back to its original shape and size and disengage the pipe (30).

The sealing device housing (10) would then have to be returned to the surface for resetting of the piston (16), i.e. replenishing the chamber (14) with air and closing off the valves (24) and (29) again.

Figure 2:
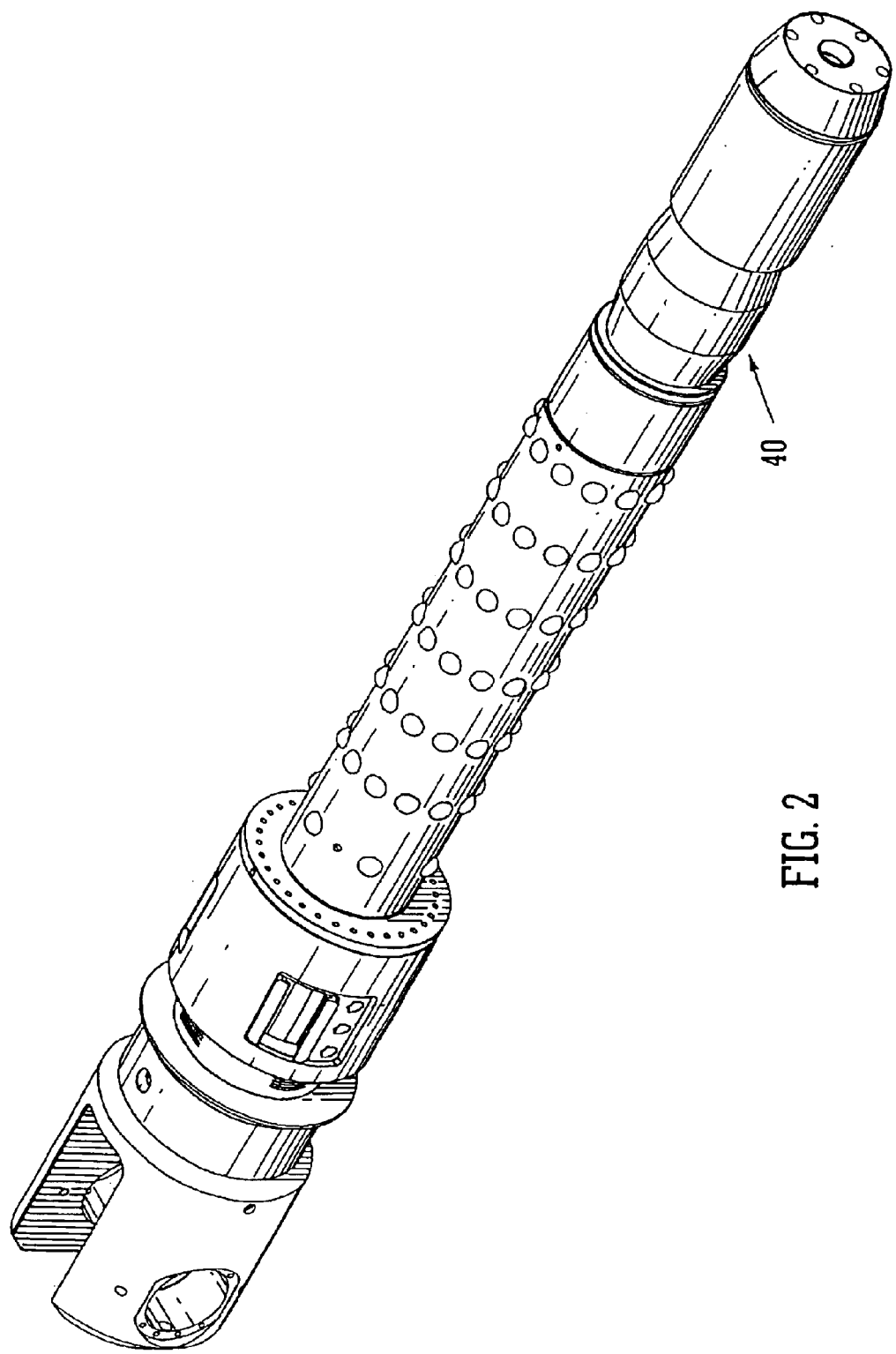
FIG. 2 is a perspective view of a pipeline recovery tool fitted with a sealing device similar to that shown in FIG. 1.

FIG. 2 simply shows at (40) where a device such as that in FIG. 1 can be incorporated in a larger Ballgrab recovery tool. Such a tool advantageously includes means for pumping water out of the pipe (30) via the throughbore (12), to aid its recovery. A check valve (32) in the bore (12) can be used to prevent backflow of water as it is pumped out.

The foregoing is illustrative and not limitative of the scope of the invention and many variations in detail are possible.

What is claimed is:

1. A tool for use under water comprising a sealing device wherein a piston, which is movable within a chamber, is capable of causing compression of a seal member, and wherein a first valve actuated inlet to the chamber at a first end of the piston allows under-water pressure to act on the piston to compress the seal member, and a second valve actuated inlet to the chamber at an opposing end of the piston allows under-water pressure to act on the piston to release the seal member.

2. A tool according to claim 1, wherein the seal member is annular.

* * * * *